US009849756B2

(12) United States Patent
Juarez Corona

(10) Patent No.: US 9,849,756 B2
(45) Date of Patent: Dec. 26, 2017

(54) SUN VISOR ASSEMBLY

(71) Applicant: Ford Global Technologies, LLC, Dearborn, MI (US)

(72) Inventor: Alejandro Juarez Corona, Tepotzotlan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/016,396

(22) Filed: Feb. 5, 2016

(65) Prior Publication Data
US 2017/0225546 A1  Aug. 10, 2017

(51) Int. Cl.
*B60J 3/02* (2006.01)

(52) U.S. Cl.
CPC .......... *B60J 3/0217* (2013.01); *B60J 3/0265* (2013.01)

(58) Field of Classification Search
CPC .................................. B60J 3/02; B60J 3/0217
See application file for complete search history.

(56) References Cited

U.S. PATENT DOCUMENTS

| 2,802,693 | A |   | 8/1957 | Lauve |
| 3,825,296 | A |   | 7/1974 | Peterson |
| 4,317,589 | A | * | 3/1982 | Kuss ...................... B60J 3/0208 296/97.6 |
| 5,040,841 | A |   | 8/1991 | Yang |
| 5,044,685 | A |   | 9/1991 | Yang |
| 7,011,354 | B1 | * | 3/2006 | Gullickson ................ B60J 3/02 296/97.11 |
| 8,070,209 | B2 |   | 12/2011 | Li et al. |

* cited by examiner

Primary Examiner — Glenn Dayoan
Assistant Examiner — Melissa A Black
(74) Attorney, Agent, or Firm — Vichit Chea; Brooks Kushman, P.C.

(57) ABSTRACT

A sun visor assembly may include a visor having a first attachment including a first magnet, and a second attachment arranged on a vehicle headliner and including a pair of spaced supports and a pin maintained therein, wherein the pin includes a second magnet and is rotatable with respect to the supports, wherein the first attachment is configured to selectively attach to the second attachment via the first and second magnets, and further wherein the pin is rotatable in an attached state to adjust an angle of the visor.

19 Claims, 3 Drawing Sheets

SUN VISOR ASSEMBLY

TECHNICAL FIELD

Disclosed herein are sun visor assemblies.

BACKGROUND

Vehicles often include sun shades or visors to prevent sun from getting into a driver's eyes and distracting the driver during driving. These sun shades often have adjustable positions in an effort to allow the driver to maneuver the sun shade to an appropriate position relative to the sun's direction.

SUMMARY

A sun visor assembly may include a visor having a first attachment including a first magnet, and a second attachment arranged on a vehicle headliner and including a pair of spaced supports and a pin maintained therein, wherein the pin includes a second magnet and is rotatable with respect to the supports, wherein the first attachment is configured to selectively attach to the second attachment via the first and second magnets, and further wherein the pin is rotatable in an attached state to adjust an angle of the visor.

A headliner attachment assembly may include a base, a pair of spaced supports, and a pin maintained between the supports and the base, the pin including a projection maintaining a headliner magnet thereon and being rotatable with respect to the supports, the projection configured to engage a recess defined by a vehicle sun visor, and an angle of the visor being adjustable in an attached state via the pin.

A headliner attachment assembly may include a pair of spaced supports and a pin maintained therein, wherein the pin includes a headliner magnet and is rotatable with respect to the supports, wherein the headliner magnet is configured to selectively attach to a visor magnet on a vehicle sun visor, and wherein an angle of the visor is adjustable via the pin.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

Figure 1:
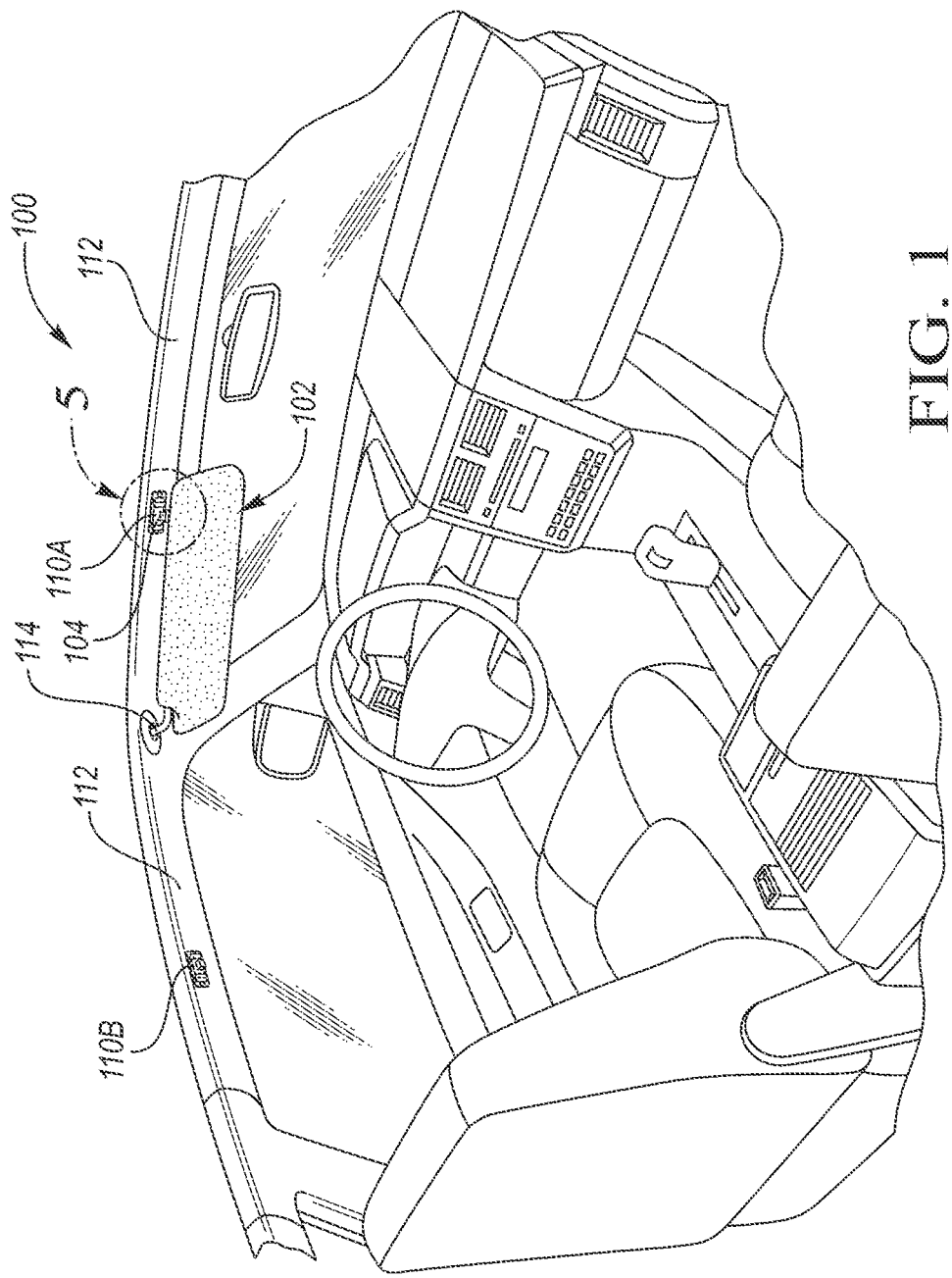
FIG. 1 illustrates an example sun visor assembly for an interior of a vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicles often include sun shades attached to a vehicle headliner to block sun from a driver's eyes during driving. Often times, the sun shades are moveable between a number of positions, allowing for a driver to adjust the position of the sun shade as needed in order to block the sun. In some cases, the sun shade may pivot at a joint and be movable from a front position at the vehicle windshield, to a side position at the driver's window. When not in use, a free end of the sun shade (e.g., the end opposite the pivot) may be attached to the vehicle headliner above the windshield via a locking mechanism. Existing mechanisms to attach the sun shade to the headliner may require mechanical force to detach the moveable end from the headliner. In some instances, the force required to move the sun shade may be too great for some users to overcome and may cause distractions to the user during driving. Furthermore, when attached to the headliner, the sun shade may not be rotationally movable, preventing certain angular adjustments of the sun shade. Furthermore, existing mechanisms may be prone to greater wear and tear due to the force required to release the sun shade from the headliner. Moreover, often only one locking mechanism is included in the headliner and there is no mechanism for maintaining the sun shade along the driver's side window.

Described herein is a sun visor assembly including a sun visor having a visor attachment mechanism. The vehicle headliner may include at least one headliner attachment mechanism configured to mate with the visor attachment mechanism. In an attached state, the sun visor may be rotationally movable at the headliner attachment mechanism, permitting radial adjustments of the sun visor. The headliner attachment mechanism may include a rotational pin maintained by two supports. Each of the visor attachment mechanism and the headliner attachment mechanism may include at least one magnet configured to attract the other magnet to attach the sun visor to the headliner. The headliner magnets may be arranged on a protrusion on the pin of the headliner attachment mechanism. The visor magnets may be arranged in a recess of a housing of the visor attachment mechanism. During attachment, the recess of the visor attachment mechanism may receive the protrusion of the headliner attachment mechanism. The magnets may attract one another and form a connection there between to maintain the projection within the recess.

Because the pin is radially moveable, the sun visor may be radially adjusted after attachment to the headliner. Furthermore, the magnets may maintain the attachment of the sun visor to the headliner, but may require less force to disengage the visor from the headliner than traditional mechanisms. The mating of the protrusion and recess may also facilitate the attachment while allowing for relatively easy disengagement. The magnetic field created between the magnets may aid in guiding the protrusion into the recess, allowing for less user precision when attaching the visor to the headliner. The mating of the protrusion and recess may prevent any lateral movement of the sun visor, while the magnets may maintain the protrusion within the recess. Together, the mating and magnetic attraction creates a secure attachment while allowing for easy disengagement.

FIG. 1 illustrates an example sun visor assembly 100 for an interior of a vehicle. The sun visor assembly 100 may include a sun visor 102 arranged at a headliner 112 of the interior of the vehicle. The sun visor 102 may be arranged at the windshield and may be configured to block light, such as sunlight, and to provide for a better driving experience. The sun visor 102 may be connected to the headliner 112 via a sun visor joint 114. The joint 114 may be configured to permit axial and angular translation of the sun visor 102. During non-use, a user may stow the sun visor 102 along the roof of the vehicle. During use, a user may pull the sun visor 102 down and adjust the sun visor 102 into a preferred position in an effort to block sun rays. By permitting the sun visor to pivot about the joint 114, the sun visor 102 may be adjusted according to a user's preference, the direction of the sun, etc.

Although shown as being arranged at a driver's side of the vehicle, a sun visor 102 may also be arranged at a passenger side of the vehicle, as well as other portions of the vehicle. The sun visor 102 may include a visor attachment mechanism 104 configured to connect or attach to one of a front headliner attachment mechanism 110A, as well as a side headliner attachment mechanism 110B (collectively referred to as headliner attachment mechanism 110). Although two headliner attachment mechanisms 110 are illustrated in FIG. 1, more or less may be included along the headliner 112. The headliner attachment mechanism 110 may be configured to axially rotate in order to allow for axial adjustments of the sun visor 102 in an attached state.

Figure 2:
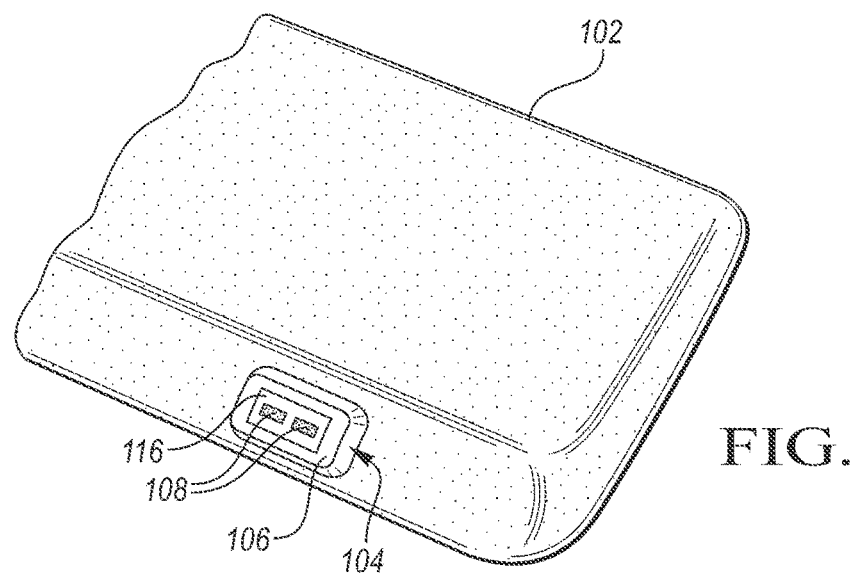
FIG. 2 illustrates a partial perspective view of a sun visor of the sun visor assembly of FIG. 1.

FIG. 2 illustrates a partial perspective view of the sun visor 102 of the sun visor assembly 100 of FIG. 1. The sun visor 102 may include the visor attachment mechanism 104. The visor attachment mechanism 104 may protrude from a side of the sun visor 102 so as to engage with one of the headliner attachment mechanisms 110. The visor attachment mechanism 104 may include a visor housing 106. The housing 106 may define a recess 116 such that the visor attachment mechanism 104 forms a hollow center. At least one visor magnet 108 may be arranged within the recess 116. In the example shown in FIG. 2, two magnets may be arranged within the housing 106. In other examples, one magnet, or a plurality of magnets, may also be used. The magnets may be permanent magnets, ferromagnetic magnets, etc.

Figure 3A:
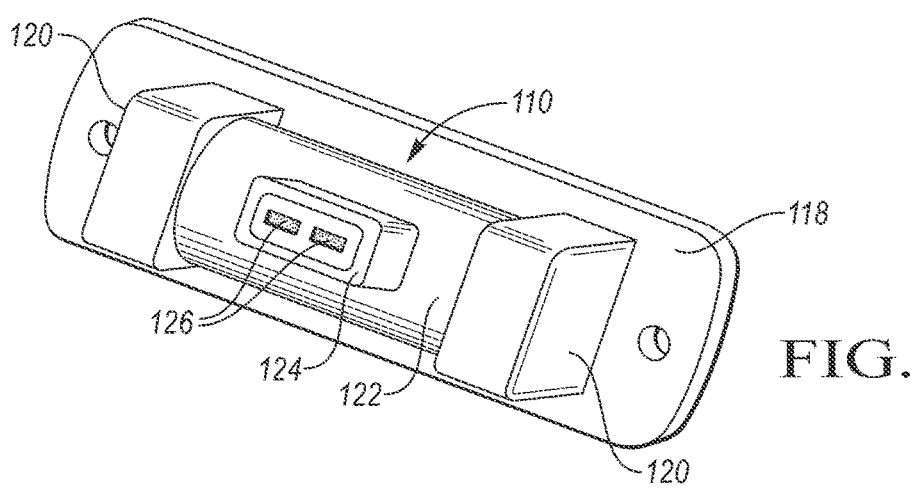
FIG. 3A illustrates a perspective view of a headliner attachment mechanism of the sun visor assembly of FIG. 1.
Figure 3B:
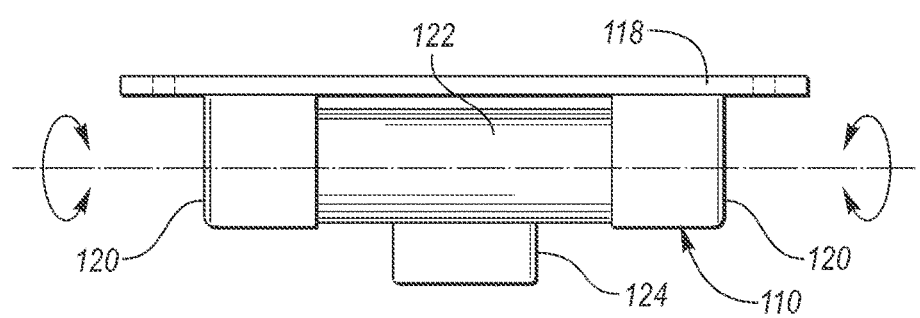
FIG. 3B illustrates a top view of the headliner attachment mechanism of FIG. 3A.

FIG. 3A illustrates a perspective view of the headliner attachment mechanism 110 of the sun visor assembly 100 of FIG. 1. FIG. 3B illustrates a top view of the headliner attachment mechanism of FIG. 3A. As shown in FIG. 1, the headliner attachment mechanism 110 may be arranged at a location along the vehicle headliner 112. The location of the attachment mechanism 110 along the headliner 112 may be determined based on the location of the visor attachment mechanism 104 so that the visor attachment mechanisms 104, 110 align in an attached state. As explained, multiple headliner attachment mechanisms 110 may be arranged along the headliner 112. In one example, similar to the example shown in FIG. 1, the front attachment mechanism 110A may be arranged at the front of the vehicle along the windshield. The side attachment mechanism 110B may be arranged along the side of the vehicle above a side window (e.g., driver's side window).

Referring to FIGS. 3A and 3B, the headliner attachment mechanism 110 may include a base 118 and a pair of spaced supports 120 configured to maintain a pin 122 against the base 118. The supports 120 may maintain the pin 122 in a fixed lateral position, while permitting radial movement of the pin 122. The headliner attachment mechanism 110 may include a projection 124 extending from the pin 122. The projection 124 may be arranged on the pin 122 between the supports 120. At least one headliner magnet 126 may be arranged on the projection 124 (as shown in FIG. 3A). Similar to the visor magnet 108, more than one magnet may be included on the projection 124. The base 112 may be fixed to the vehicle headliner 112 via a bolted, welded, screwed, glued, or other attachment method. The pin 122, supports 120, and projection 124 may be made of polyurethane or polypropylene.

In the installed state, the recess 116 of the visor attachment mechanism 104 (as shown in FIG. 2) may be configured to receive the projection 124. The visor magnets 108 may attract the headliner magnets 126 and create connection there between. In this installed state, lateral movement of the sun visor 102 relative to the base 118 is prevented due to the projection 124 being received by the recess 116. Furthermore, the sun visor 102 is selectively fixed to the headliner via the magnets 108, 126. The magnets 108, 126 may create a magnetic field strong enough to maintain the magnets 108, 126 in an attached position, but weak enough that a user may be able to pull the visor 102 away from the headliner attachment mechanism 104 without undue force.

Figure 4A:
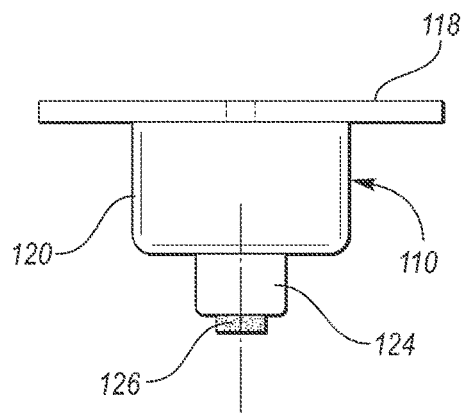
FIG. 4A illustrates a side view of the headliner attachment mechanism of FIG. 3A with a projection being arranged perpendicular to a vehicle headliner.
Figure 4B:
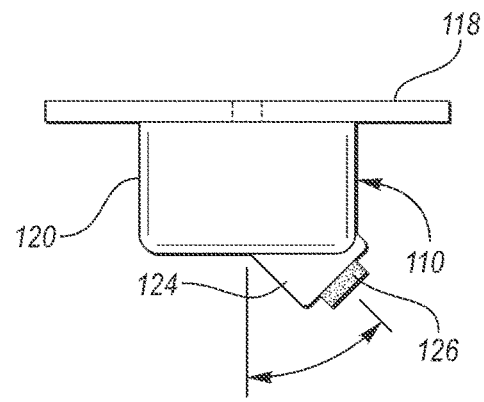
FIG. 4B illustrates another side view of the headliner attachment mechanism of FIG. 3A with the projection being arranged at a 45 degree offset from the vehicle headliner.
Figure 4C:
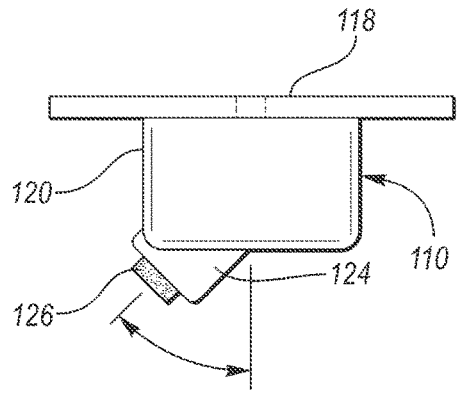
FIG. 4C illustrates another side view of the headliner attachment mechanism of FIG. 3A with the projection being arranged at a 120 degree offset from the vehicle headliner.

FIGS. 4A-4C show side views of the headliner attachment mechanism 110 of FIG. 3A. FIG. 4A illustrates a side view of the headliner attachment mechanism 110 whereby the projection 124 is arranged perpendicular (e.g., 90 degrees) relative to the base 118. As explained, the pin 122 may be rotatable within the supports 120 such that the pin 122 may extend 180 degrees between a position parallel with the base 118 on one side, to a position parallel with the base 118 on the opposite side. The pin 122, while moveable with respect to the supports 120, may abut the interior of the supports 120 with enough friction so as to maintain its position relative to the supports 120 when in a resting state. If pressure is applied to the projection 124, the pin 122 and projection 124 may rotate in response to the force.

FIG. 4B illustrates a side view of headliner attachment mechanism 110 whereby the projection 124 is arranged off-center (e.g., 45 degrees) relative to the base 118. FIG. 4C illustrates a side view of headliner attachment mechanism 110 whereby the projection 124 is arranged off-center in a direction opposite of that of FIG. 4B (e.g., 120 degrees) relative to the base 118. Accordingly, the rotation flexibility of the pin 122 may permit the position of the headliner attachment mechanism 110 to be adjusted by the user.

Figure 5:
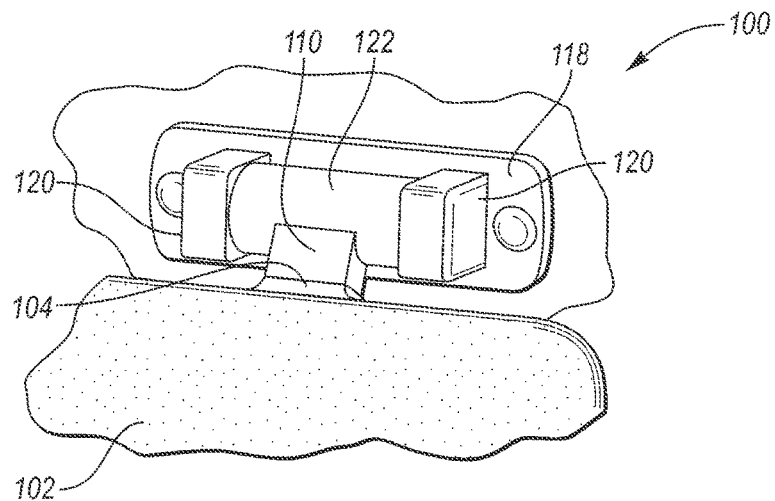
FIG. 5 illustrates a perspective view of the sun visor assembly in an attached state.

FIG. 5 illustrates a perspective view of the sun visor assembly 100 in an attached state where the recess 116 of the visor attachment mechanism 104 receives the projections 124 of the headliner attachment mechanism 110. In the attached state, the pin 122 is movable within the supports 120 and thus, the angle of the visor 102 may be adjusted while still being attached to the headliner attachment mechanism 110.

Accordingly, disclosed herein is a sun visor assembly configured to permit a user to easily attach and detach a sun visor from various locations along the vehicle headliner. The vehicle headliner may include at least one headliner attachment mechanism configured to mate with the visor attachment mechanism. The headliner attachment mechanism may include a rotational pin maintained by two supports. At least one magnet may be maintained on a projection on the pin. The projection may be rotatable at least 180 degrees relative to the headliner. The visor attachment mechanism may include a housing that defines a recess. At least one magnet may be included in the recess. During attachment, the protrusion of the headliner attachment mechanism may be received by the recess of the visor attachment mechanism. The magnets may attract one another and form a connection there between to maintain the projection within the recess.

The mating of the protrusion and recess may prevent any lateral movement of the sun visor, while the magnets may aid in maintaining the mating. Together, the mating and magnetic attraction create a secure attachment while allowing for easy disengagement.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A sun visor assembly, comprising:
    a visor having a first attachment including a first magnet; and
    a second attachment arranged on a vehicle headliner and including a pair of spaced supports and a pin maintained therein, wherein the pin includes a second magnet and is rotatable with respect to the supports, wherein the first attachment is configured to selectively attach to the second attachment via the first and second magnets, and wherein the pin is rotatable in an attached state to adjust an angle of the visor.

2. The assembly of claim 1, wherein the second attachment includes at least one projection extending outwardly from the pin to maintain the second magnet.

3. The assembly of claim 2, wherein the first attachment includes a housing defining a recess, wherein the first magnet is arranged in the recess, and wherein the recess is configured to receive the projection in the attached state.

4. The assembly of claim 2, wherein the projection is rotatable with respect to the vehicle headliner via the pin.

5. The assembly of claim 1, wherein the first magnet includes a pair of first magnets.

6. The assembly of claim 1, wherein the second magnet includes a pair of second magnets.

7. The assembly of claim 1, wherein the visor includes a pivot mechanism at one end to permit pivotable movement of the visor about the pivot mechanism and wherein the visor includes the first attachment at an end opposite the pivot mechanism.

8. The assembly of claim 1, wherein the second attachment is arranged at the vehicle headliner above a vehicle windshield.

9. The assembly of claim 1, wherein the second attachment is arranged at the vehicle headliner above a vehicle side window.

10. A headliner attachment assembly, comprising:
    a base;
    a pair of spaced supports; and
    a pin maintained between the supports and the base, the pin including a projection maintaining a headliner magnet thereon and being rotatable with respect to the supports, the projection configured to engage a recess defined by a vehicle sun visor, and an angle of the visor being adjustable in an attached state via the pin.

11. The assembly of claim 10, wherein upon engagement with the recess the headliner magnet is configured to attach with a visor magnet arranged in the recess.

12. The assembly of claim 11, wherein the visor magnet includes a pair of visor magnets.

13. The assembly of claim 10, wherein the headliner magnet includes a pair of headliner magnets.

14. The assembly of claim 10, wherein the base is arranged at a vehicle headliner above a vehicle windshield.

15. A headliner attachment assembly, comprising:
    a pair of spaced supports and a pin maintained therein, wherein the pin includes a headliner magnet and is rotatable with respect to the supports, wherein the headliner magnet is configured to selectively attach to a visor magnet arranged in a recess defined by a vehicle sun visor, and wherein an angle of the visor is adjustable via the pin.

16. The assembly of claim 15, further comprising at least one projection extending outwardly from the pin to maintain the headliner magnet.

17. The assembly of claim 16, wherein the projection is rotatable with respect to the supports via the pin.

18. The assembly of claim 15, wherein the headliner magnet includes a pair of headliner magnets.

19. The assembly of claim 15, wherein the visor magnet includes a pair of visor magnets.

* * * * *